(12) United States Patent
Yamanaka et al.

(10) Patent No.: US 9,023,961 B2
(45) Date of Patent: May 5, 2015

(54) ACRYLIC RESIN COMPOSITION, METHOD OF MANUFACTURING THE SAME, AND ARCHITECTURAL MATERIAL, FASHION ACCESSORY, AND OPTICAL MATERIAL FORMED USING THE SAME

(75) Inventors: Junpei Yamanaka, Nagoya (JP); Akiko Toyotama, Nagoya (JP); Fumio Uchida, Osaka (JP); Satoshi Kawanaka, Osaka (JP)

(73) Assignee: Fuji Chemical Company, Limited, Osaka-Shi, Osaka (JP)

( * ) Notice: Subject to any disclaimer, the term of this patent is extended or adjusted under 35 U.S.C. 154(b) by 0 days.

(21) Appl. No.: 13/375,210

(22) PCT Filed: Aug. 19, 2010

(86) PCT No.: PCT/JP2010/064019
§ 371 (c)(1),
(2), (4) Date: Nov. 29, 2011

(87) PCT Pub. No.: WO2011/024709
PCT Pub. Date: Mar. 3, 2011

(65) Prior Publication Data
US 2012/0142860 A1    Jun. 7, 2012

(30) Foreign Application Priority Data
Aug. 24, 2009  (JP) ................................ 2009-193171

(51) Int. Cl.
C08F 2/44      (2006.01)
C08K 3/36      (2006.01)
C08F 265/06    (2006.01)
(Continued)

(52) U.S. Cl.
CPC ..................................... *C08L 33/12* (2013.01)

(58) Field of Classification Search
None
See application file for complete search history.

(56) References Cited

U.S. PATENT DOCUMENTS 6,881,448 B1    4/2005  Hattori .......................... 427/307
2005/0095417 A1  5/2005  Jiang .......................... 428/304.4
(Continued)

FOREIGN PATENT DOCUMENTS

JP    06-100432      4/1994
JP    2001-191025    7/2001
(Continued)

OTHER PUBLICATIONS

Nippon Shokubai Particle Products Table. http://www.shokubai.co.jp/en/products/electronic/epokara.html, Accessed Mar. 5, 2013.*
(Continued)

*Primary Examiner* — Robert C Boyle
*Assistant Examiner* — Stephen Rieth
(74) *Attorney, Agent, or Firm* — Volpe and Koenig, P.C.

(57) ABSTRACT

The present invention provides an acrylic resin composition containing a polycrystal of colloidal particles of silicon oxide in an acrylic resin that is formed by curing an acrylic monomer liquid at room temperature and/or an acrylic oligomer liquid at room temperature, wherein a mean distance between the colloidal particles in the polycrystal is 140 to 330 nm. The size of the single crystal that constitutes the polycrystal can be controlled by adjusting the content of silicon oxide and/or the additive amount of impurities. An architectural material, a fashion accessory, and an optical material are provided that are formed by using the acrylic resin composition.

6 Claims, 5 Drawing Sheets

(51) Int. Cl.
  *C08L 33/12*  (2006.01)
  *C08F 2/46*   (2006.01)
  *C08F 2/48*   (2006.01)

(56) References Cited

U.S. PATENT DOCUMENTS

| | | | |
|---|---|---|---|
| 2008/0305968 A1 | 12/2008 | Nakamura et al. | 506/20 |
| 2009/0047352 A1* | 2/2009 | Butler et al. | 424/489 |

FOREIGN PATENT DOCUMENTS

| | | |
|---|---|---|
| JP | 2005-325173 | 11/2005 |
| JP | 2006-247915 | 9/2006 |
| JP | 2007-510183 | 4/2007 |
| JP | 2008-303261 | 12/2008 |
| JP | 2010-132771 | 6/2010 |
| WO | WO 03/100139 A1 | 12/2003 |

OTHER PUBLICATIONS

Shin-Nakamura Photo Curable Monomers/Oligomers Table. http://www.shin-nakamura.com/english/products/monomer-oligomer.html, Accessed Mar. 7, 2013.*

Machine Translation of WO 03/100139 A1. Apr. 12, 2003.*

Partial Written Translation of WO 03/100139 A1. Apr. 12, 2003.*

Definition of Iridescence. Merriam-Webster Dictionary. http://www.merriam-webster.com/dictionary/iridescence. As viewed on Jan. 6, 2014.*

German language office action dated Apr. 26, 2013 and its English language translation issued in corresponding German application 112010003375.7.

UK examination report dated Feb. 25, 2013 issued in corresponding GB application GB1201331.4.

* cited by examiner (a)

(b)

ACRYLIC RESIN COMPOSITION, METHOD OF MANUFACTURING THE SAME, AND ARCHITECTURAL MATERIAL, FASHION ACCESSORY, AND OPTICAL MATERIAL FORMED USING THE SAME

CROSS-REFERENCE TO THE RELATED APPLICATIONS

This application is a national stage of international application No. PCT/JP2010/064019, filed on Aug. 19, 2010, and claims the benefit of priority under 35 USC 119 to Japanese Patent Application No. 2009-193171, filed on Aug. 24, 2009, the entire contents of which are incorporated herein by reference.

TECHNICAL FIELD

The present invention relates to an acrylic resin composition in which a polycrystal of colloidal particles of silicon oxide is contained in an acrylic resin, a method of manufacturing the same, and an architectural material, a fashion accessory, and an optical material formed using the same.

BACKGROUND ART

A fixed colloidal crystal has been conventionally known, in which colloidal particles are regularly arranged without making adjacent colloidal particles substantially contact with one another by dispersing the colloidal particles in a solvent containing a polymerizable substance and polymerizing the polymerizable substance (refer to Patent Document 1, for example).

A fixed colloidal crystal is described in Patent Document 1, in which a polycrystal of colloidal particles of silicon oxide is fixed by repulsion of the polymer chain by mixing silicon oxide having a particle size of 136 nm into ethylene dimethacrylate and methyl methacrylate so that the content of silicon oxide becomes 31% by weight.

However, the peak wavelength in the reflection spectrum of the fixed colloidal crystal described in Patent Document 1 is about 530 nm, and arbitrary play of color could not be exhibited over a wide wavelength range (343 to 808 nm) from purple to red.

On the other hand, there is a method of packing with colloidal particles consisting of fine particles of silicon oxide, or the like in a liquid such as water by a closest packing method (refer to Patent Document 2, for example). It is described in Patent Document 2 that packing with colloidal particles can be performed in a short time by closest packing by irradiating the liquid containing the fine particles with an ultrasound wave.

However, in the method described in Patent Document 2, it is necessary to vaporize or volatilize the liquid with an ultrasound wave and colloidal particles cannot be always packed in a short time depending on the concentration and the composition of the liquid. Therefore, there are problems in terms of mass productivity and cost.

There is a method of manufacturing a colloidal crystal that is fixed with a polymer by polymerizing monomers in which colloidal particles are dispersed (refer to Patent Document 3, for example).

However, the colloidal crystal obtained in the method described in Patent Document 3 may possibly not exhibit sufficient play of color because the method does not intentionally control the size of the single crystal. That is, the fixed colloidal crystal is constituted of a polycrystal containing many single crystals. The play of color means a change in hue accompanied with change of viewing angle as seen in the jewel opal. One of the reasons why the play of color can be seen is considered that various crystal faces can be seen in the polycrystal due to the many single crystals described above. When the size of the single crystal is not intentionally controlled, the polycrystal may possibly be constituted of small single crystals. When the size of the single crystal is too small, visibility of the polycrystal deteriorates, and sufficient play of color cannot be exhibited. A colloidal crystal that does not exhibit sufficient play of color is not suitable for an architectural material, a fashion accessory, an optical material, and the like.

PRIOR ART DOCUMENTS

Patent Documents

[Patent Document 1] Republished Publication No. WO2003/100139
[Patent Document 2] Japanese Patent Application Laid-Open No. 2006-247915
[Patent Document 3] Japanese Patent Application Laid-Open No. 2008-303261

SUMMARY OF THE INVENTION

Problem to be Solved by the Invention

An object of the present invention is to provide an acrylic resin composition that can exhibit arbitrary play of color over a wide wavelength range from purple to red and that can be relatively easily manufactured, a method of manufacturing the same, and an architectural material, a fashion accessory, and an optical material formed using the same.

Means for Solving the Problem

The acrylic resin composition of the present invention contains a polycrystal of colloidal particles of silicon oxide in an acrylic resin that is formed by curing an acrylic monomer liquid at room temperature and/or an acrylic oligomer liquid at room temperature, and a mean distance between the colloidal particles in the polycrystal is 140 to 330 nm.

In the method of manufacturing the acrylic resin composition of the present invention, the size of a single crystal that constitutes the polycrystal is controlled by adjusting the content of silicon oxide and/or the additive amount of impurities.

The architectural material of the present invention is formed using the acrylic resin composition.

The fashion accessory of the present invention is formed using the acrylic resin composition.

The optical material of the present invention is formed using the acrylic resin composition.

Effects of the Invention

According to the acrylic resin composition of the present invention, arbitrary play of color can be exhibited over a wide wavelength range from purple to red because the mean distance between the colloidal particles that are adjacent to one another can be set over a wide range of 140 to 330 nm. Because the acrylic resin composition of the present invention contains a polycrystal of silicon oxide in an acrylic resin, there is no problem caused by vaporization or volatilization of a liquid with an ultrasound wave as in a conventional closest packing method. In addition, because the acrylic resin composition can be efficiently formed in a relatively short time of about 1 hour to 3 days, the composition is advantageous in terms of cost and excellent in mass productivity.

According to the manufacturing method of the present invention, the visibility of the polycrystal can be enhanced and sufficient play of color can be exhibited because the size of the single crystal that constitutes the polycrystal is intentionally controlled by adjusting the content of silicon oxide and/or the additive amount of impurities. The architectural material, the fashion accessory, and the optical material of the present invention can exhibit good play of color because they are formed using the acrylic resin composition.

MODE FOR CARRYING OUT THE INVENTION

Figure 1:
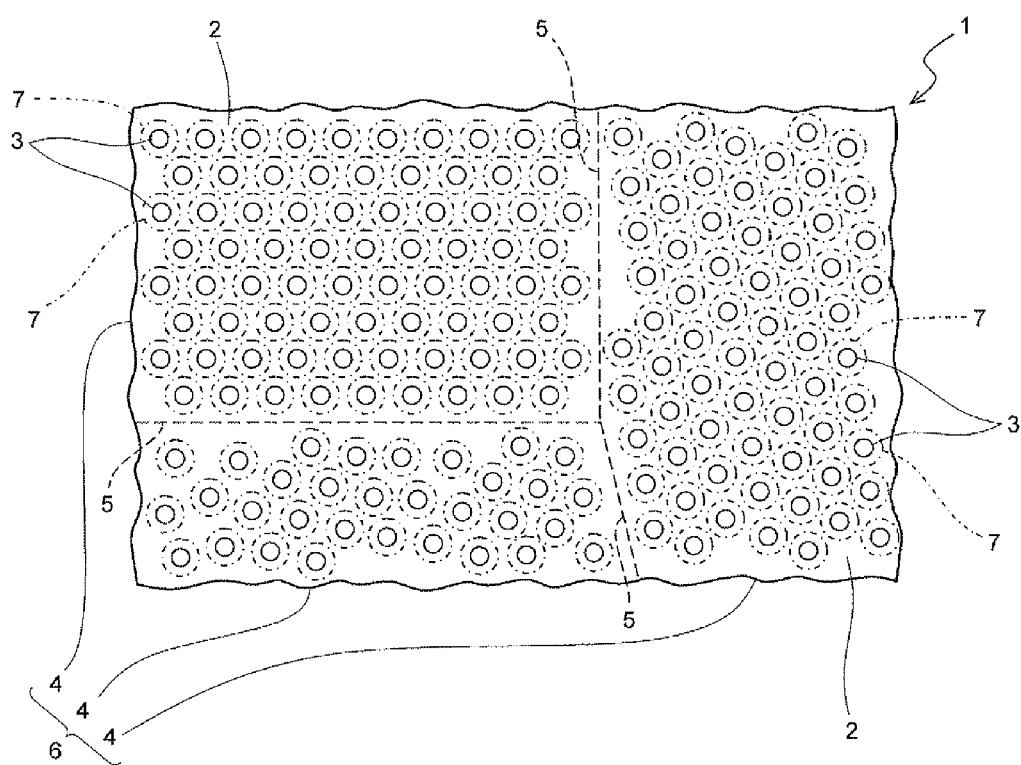
FIG. 1 is a partially magnified schematic illustrative drawing showing the acrylic resin composition according to one embodiment of the present invention.
Figure 2:
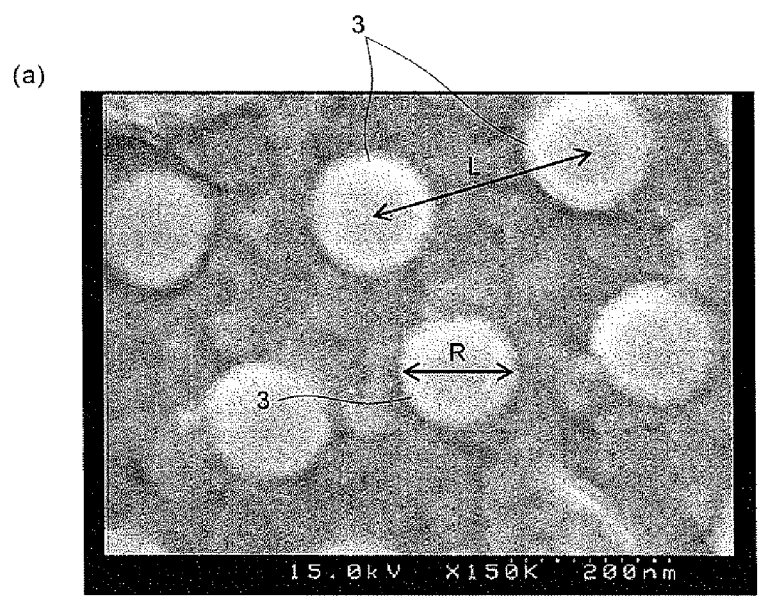
FIG. 2(a) is a scanning electron microscope (SEM) picture of the acrylic resin composition according to one embodiment of the present invention.
FIG. 2(b) is a schematic illustrative drawing of FIG. 2(a).
Figure 2:
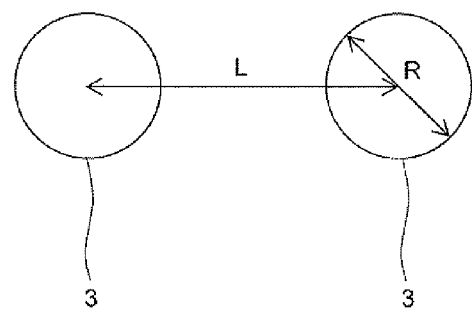

One embodiment of the acrylic resin composition according to the present invention is explained in detail below with reference to FIG. 1 and FIGS. 2(a) and 2(b). As shown in FIG. 1, an acrylic resin composition 1 according to the present embodiment contains a polycrystal 6 of colloidal particles 3 in an acrylic resin 2.

The polycrystal 6 is constituted of many single crystals 4. The orientations of the colloidal particles 3 that constitute each of the single crystals 4 in the single crystals 4 that are adjacent to one another are different at boundaries 5. The colloidal particles 3 that are adjacent to one another are repelled from one another by electrostatic force 7. Each constituent of the acrylic resin composition 1 is specifically explained below.

The acrylic resin 2 is formed by curing an acrylic monomer liquid at room temperature and/or an acrylic oligomer liquid at room temperature. The "room temperature" means a temperature of 15 to 30° C. However, it is not limited to this temperature range. When the acrylic monomer and/or oligomer is liquid at room temperature, the colloidal particles 3 can be easily dispersed. Each of the acrylic monomers and oligomers can be used alone or two or more of them can be used together.

Examples of the acrylic monomer liquid at room temperature include monofunctional monomers of methyl (meth) acrylate, 2-hydroxyethyl(meth)acrylate, 2-hydroxypropyl (meth)acrylate, 4-hydroxybutyl (meth)acrylate, methoxytriethylene glycol (meth)acrylate, methoxytetraethylene glycol (meth)acrylate, methoxypolyethylene glycol (meth)acrylate, and the like; difunctional monomers of ethylene di(meth)acrylate, triethylene glycol di(meth)acrylate, tetraethylene glycol di(meth)acrylate, polyethylene glycol di(meth)acrylate, polypropylene glycol di(meth)acrylate, and the like; and multifunctional monomers of trimethylolpropane tri(meth)acrylate, pentaerythritol tri(meth)acrylate, dipentaerythritol hexa(meth)acrylate, pentaerythritol tetra (meth)acrylate, and the like. One kind or two kinds or more of these may be mixed and used.

Examples of the acrylic oligomer liquid at room temperature include homopolymers and copolymers of the above-described monofunctional monomers, difunctional monomers, and multifunctional monomers. The weight average molecular weight of the acrylic oligomer is not especially limited as long as it is liquid at room temperature.

The content of the acrylic resin 2 is preferably 35 to 90% by weight relative to the total amount of the acrylic resin composition 1. When the content of the acrylic resin 2 is 35% by weight or more, visibility can be improved to exhibit play of color over a wide wavelength range from purple to red. When the content of the acrylic resin 2 is 90% by weight or less, visibility can be improved to exhibit play of color having the polycrystal 6 as a main component because each of the colloidal particles 3 can be regularly arranged by exerting the electrostatic force 7 of the colloidal particles 3 between the adjacent colloidal particles 3.

On the other hand, the colloidal particles 3 are made of silicon oxide and are dispersed in the acrylic resin 2. The polycrystal 6 is formed with the colloidal particles 3 in which single crystals having a body-centered cubic structure with different orientations are mixed, in which single crystals having a face-centered cubic structure with different orientations are mixed, or in which single crystals having a body-centered cubic structure and single crystals having a face-centered cubic structure are mixed. However, the colloidal particles 3 are regularly arranged as a whole.

Repulsive force by the electrostatic force 7 acts between the colloidal particles 3 that are adjacent to one another, and as shown in FIGS. 2(a) and 2(b), the mean distance L between the colloidal particles 3 in the polycrystal 6 is kept at 140 to 330 nm, preferably 150 to 300 nm, and more preferably 160 to 290 nm.

When the mean distance L between the colloidal particles 3 is 140 nm or more, a diffracted wavelength $\lambda$, that can be obtained from the mean distance L between the colloidal particles 3 is determined by the formula: $2 \times 1.5 \times 2/6^{1/2} \times 140 = 343$ nm when the refractive index of the sample is 1.5 for example, and does not become shorter than the visible light wavelength. Therefore, visibility can be improved to exhibit play of color having the polycrystal 6 as a main component.

When the mean distance L between the colloidal particles 3 is 330 nm or less, the diffracted wavelength $\lambda$ that can be obtained from the crystal structure is determined by the formula $2 \times 1.5 \times 2/6^{1/2} \times 330 = 808$ nm, and does not become longer than the visible light wavelength. Therefore, visibility can be improved to exhibit the play of color having the polycrystal 6 as a main component.

The mean distance L between the colloidal particles 3 can be controlled to a desired value by adjusting the content of silicon oxide in the acrylic resin composition 1, for example. The content of silicon oxide is preferably 10 to 65% by weight to the total amount of the acrylic resin composition 1. When the content of silicon oxide is increased within this range, the mean distance L between the colloidal particles 3 tends to become small, whereas when the content of silicon oxide is decreased, the mean distance L between the colloidal particles 3 tends to become large. When the content of silicon oxide is within the above-described range, visibility can be improved to exhibit the play of color having the polycrystal 6 as a main component because each of the colloidal particles 3 can be regularly arranged by exerting the electrostatic force 7 of the colloidal particles 3 between the adjacent colloidal particles 3.

The mean distance L between the colloidal particles 3 can be measured as follows. It can be measured using a SEM image (refer to FIG. 2(*a*)) obtained by observing a secondary electron compositional image of an arbitrary fracture cross-section of the acrylic resin composition 1 using a scanning electron microscope (SEM: S-4100 manufactured by Hitachi, Ltd.) at an accelerating voltage of 15 kV. More specifically, the mean distance L between the colloidal particles 3 can be measured by measuring the distance from the center of one colloidal particle 3 to the center of another colloidal particle 3 adjacent thereto at arbitrarily selected 10 positions in the SEM image, calculating the average value of the measurement, and converting this average value according to the magnification of the SEM. An appropriate magnification is about 10,000 to 200,000×.

The mean diameter R of the colloidal particles 3 is 70 to 238 nm, and preferably 120 to 220 nm. When the mean diameter R of the colloidal particles 3 is 70 nm or more, the diffracted wavelength does not become shorter than the visible light wavelength, and visibility can be improved to exhibit the play of color having the polycrystal 6 as a main component. When the mean diameter R of the colloidal particles 3 is 238 nm or less, the diffracted wavelength does not become longer than the visible light wavelength, and visibility can be improved to exhibit the play of color having the polycrystal 6 as a main component.

The mean diameter R of the colloidal particles 3 can be measured by the SEM for a powder, or a particle size distribution analyzer such as a disc centrifugal particle size distribution analyzer (DC24000 manufactured by CPS Instruments, Inc.) for a dispersion.

The colloidal particles 3 can be produced by a known method using water glass or an alkoxide of silicon with silicon oxide as a raw material. The colloidal particles 3 having an arbitrary particle size can be obtained by a method of hydrolyzing an alkoxide of silicon by an alkali or by laminating silicon oxide including water glass as a raw material.

Next, one embodiment of a method of manufacturing the acrylic resin composition 1 is explained. The silicon oxide powder that constitutes the colloidal particles 3 of the acrylic resin composition 1 can be produced as follows, for example. First, 100 to 300 g of colloidal silica and 100 to 300 g of an alcohol such as methanol are weighed, put in a container, and mixed. Examples of a material that constitutes the container include polypropylene.

Then, the mixture is separated into a solid component and a liquid component by centrifugation with a centrifugal separator. The centrifugation may be performed at a rotational speed of about 8,000 to 10,000 rpm and for about 30 minutes to 1 hour and 30 minutes.

After the centrifugation, the supernatant liquid produced in the container is discarded, almost the same amount of alcohol as the discarded liquid is weighed and placed in the container, and the resultant is separated again into a solid component and a liquid component by centrifugation. This step is repeated about two to four times. With this operation, the silicon oxide powder to be obtained can be easily dispersed. After the separation is completed, a silicon oxide powder is obtained by drying the solid component in a dryer at a temperature of 35 to 60° C. The drying can also be performed in vacuum.

The mean diameter of the silicon oxide powder is 70 to 238 nm, and preferably 120 to 220 nm. With this mean diameter, the particle size of the colloidal particles 3 and the distance between the adjacent colloidal particles 3 are properly adjusted, and visibility can be improved to exhibit the play of color having the polycrystal 6 as a main component. The mean diameter of the silicon oxide powder can be measured by the SEM.

The obtained silicon oxide powder is added to an acrylic monomer liquid at room temperature and/or an acrylic oligomer liquid at room temperature and is dispersed. This dispersing is preferably performed using an ultrasound wave dispersing apparatus. As a condition of the ultrasound wave, the frequency is preferably about 10 to 50 kHz, and the time is preferably about 1 to 15 hours.

The acrylic resin composition 1 containing the polycrystal 6 of the colloidal particles 3 in the acrylic resin 2 is obtained by dispersing the silicon oxide powder in the acrylic monomer and/or oligomer, adding a polymerization initiator, and curing the acrylic monomer and/or oligomer by photopolymerization by irradiation with an ultraviolet ray or by thermal polymerization by heating. According to the above-described manufacturing method, the manufacture does not require a long time as with the conventional closest packing method, and the acrylic resin composition 1 can be formed normally in a short time of about 1 hour to 3 days. Therefore, the manufacturing method is advantageous in terms of cost and excellent in mass productivity.

The kind of the polymerization initiator can be appropriately selected according to the curing method such as an ultraviolet ray or heat. Specific examples of the polymerization initiator include benzoin ethers such as benzyl, benzoin, and benzoin methyl ether; acetophenones such as 2-hydroxy-2-methylpropiophenone, p-t-butyltrichloroacetophenone, and p-t-butyldichloroacetophenone; benzophenones such as benzophenone, o-benzoyl methyl benzoate, and 4-chlorobenzophenone; azo compounds such as 2,2'-azobisisobutylonitrile, 2,2'-azobis[2-methyl-N-(2-hydroxyethyl)propionamide], and 2,2'-azobis(N-butyl-2-methylpropionamide); and peroxides such as benzoyl peroxide, potassium persulfate, and ammonium persulfate. One kind or two kinds or more of these can be mixed and used.

The size of the single crystal 4 that constitutes the polycrystal 6 can be controlled by adjusting the content of silicon oxide and/or the additive amount of impurities. The size of the single crystal 4 that constitutes the polycrystal 6 can made large and the visibility of the polycrystal 6 can be improved by decreasing the content of silicon oxide, that is, by keeping the adjacent colloidal particles 3 away from one another or by weakening the electrostatic force 7 of the colloidal particles 3 by adding impurities to the acrylic resin composition 1. The following reason can be surmised for why the single crystal 4 becomes large by weakening the electrostatic force 7. When the electrostatic force 7 is weakened, the distance of the influence of the electrostatic force 7 becomes short, and the volume (the apparent particle density) including a portion capable of electrostatic repulsion decreases. Therefore, nucleation of the crystal becomes difficult to occur. Because of that, the number of crystal nuclei decreases, and the single crystal 4 to be produced becomes large.

Specifically, the size of the single crystal 4 can be controlled to 5 mm or more, and preferably 5 to 15 mm. The size of the single crystal 4 means the diameter of a minimum circumscribed circle surrounding the single crystal 4 when the single crystal 4 is observed from a direction perpendicular thereto.

The adjustment of the content of silicon oxide and the addition of the impurities can be performed either singly or in combination. Examples of the impurities include inorganic salts such as sodium chloride, sodium bicarbonate, and potassium chloride; organic substances such as pyridine, quaternary ammonium, monoethanolamine, triethanolamine, and diethylamine; and colloidal particles having different polymerizable substances, solvents, and mean diameters, and one kind or two kinds or more of these may be mixed and used. The impurities can be added before and after the silicon oxide powder is added to and dispersed in the acrylic monomer and/or oligomer. The content of the impurities is preferably 90% by weight or less relative to the total amount of the acrylic resin composition 1.

Figure 3:
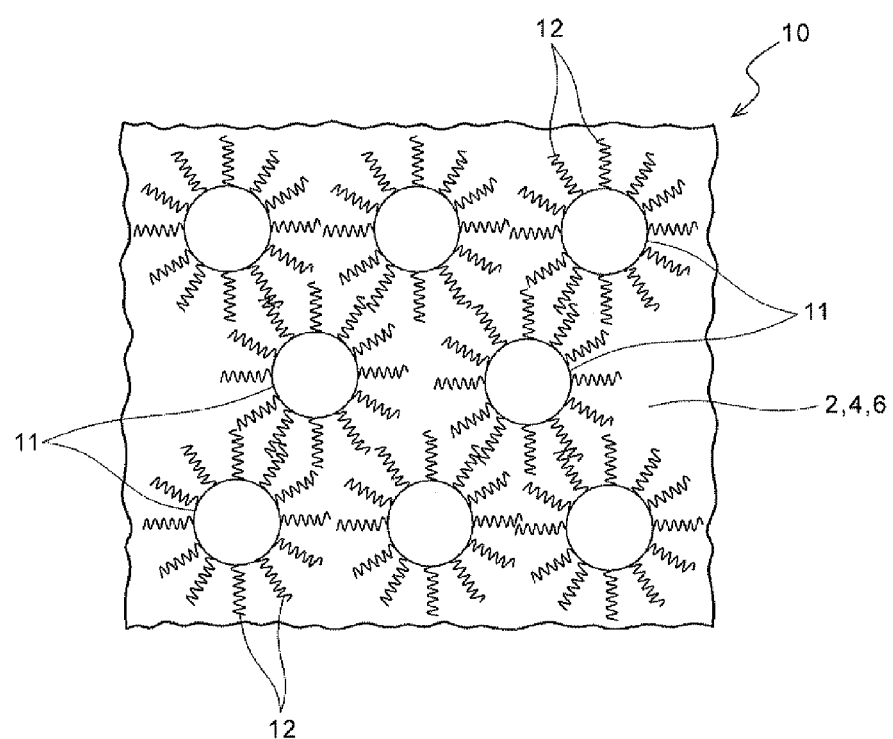
FIG. 3 is a partially magnified schematic illustrative drawing showing the acrylic resin composition according to another embodiment of the present invention.

Next, another embodiment of the acrylic resin composition of the present invention is explained in detail with reference to FIG. 3. In FIG. 3, the same reference numbers are appended to the components as those in FIG. 1 and FIGS. 2(*a*) and 2(*b*), and the explanation is omitted.

As shown in FIG. 3, the repulsion between colloidal particles 11 that are adjacent to one another in an acrylic resin composition 10 according to the present embodiment is repulsion of the polymer chain. That is, the colloidal particles 11 that are adjacent to one another repel one another by a polymer chain 12 modified by the colloidal particles 11. The repulsion of the polymer chain of the colloidal particles 11 can be effected by dispersing the silicon oxide powder in a solvent containing a polymerizable substance.

Examples of the polymerizable substance include vinyl monomers and oligomers such as methyl (meth)acrylate, vinyl acetate, styrene, 2-hydroxyethyl (meth)acrylate, 4-hydroxybutyl (meth)acrylate, methyl (meth)acrylate, and ethylene di(meth)acrylate; cyclic ethers such as ethylene oxide, trimethylene oxide, tetrahydrofuran, and tetrahydropyran; cyclic esters such as β-propiolactone; cyclic amides such as ε-caprolactam; and monomers that produce polysilanes such as methylsilane and phenylsilane. One kind or two kinds or more of these may be mixed and used. The content of the polymerizable substance is preferably 35 to 90% by weight to the total amount of the acrylic resin composition 10.

Examples of the solvent include water, acetonitrile, N,N-dimethylformamide, nitrobenzene, methanol, ethanol, acetone, isopropyl alcohol, ethylene glycol, glycerin, tetrahydrofuran, ethyl acetate, chloroform, dioxane, and acrylonitrile, and one kind or two kinds or more of these may be mixed and used.

In the present embodiment, a silicon oxide powder coated with an organic molecule may be used as the silicon oxide powder. With this configuration, affinity of the silicon oxide powder to the polymerizable substance can be improved. In this case, the overall mean diameter of the powder including the organic molecule is preferably in the range described above, that is, 70 to 238 nm.

Examples of the organic molecule include poly (methyl (meth) acrylate), polystyrene, poly (maleic anhydride), poly (methyl (meth) acrylate), and copolymers thereof, and one kind or two kinds or more may be mixed and used. The organic molecules exemplified above may have an appropriate functional group to improve the affinity to the surface of the particle. Examples of effective functional groups include a trimethoxysilane group and a triethoxysilane group. The amount of the organic molecule that covers the surface of the silicon oxide powder is preferably about 2 to 20% by weight relative to the weight of the particle. Other components are the same as in the acrylic resin composition 1 according to the first embodiment that has been described above, and the explanation is omitted.

The acrylic resin composition according to the present invention that is explained above is suitable for a composite member that is used in an architectural material, a fashion accessory, an optical material, and the like. Examples of the architectural material to which the acrylic resin composition according to the present invention can be applied include inner and external wall materials and a flooring material. Examples of the fashion accessory to which the acrylic resin composition according to the present invention can be applied include rings, necklaces, earrings, and brooches in which an opalesce jewel is used. Examples of the optical material to which the acrylic resin composition according to the present invention can be applied include tunable photonic crystals for a laser oscillator with variable wavelength and various optical filters.

The use of the acrylic resin composition according to the present invention is not limited to the architectural material, the fashion accessory, and the optical material described above, and the composition can be suitably used in a field where arbitrary play of color is required over a wide wavelength range from purple to red.

The present invention is further explained in detail by referring to examples below. However, the present invention is not limited to the examples below. In the present examples, identification of the acrylic resin, the mean diameter of the colloidal particles, identification of silicon oxide and its content, the mean distance between the colloidal particles, crystallinity, and visibility were investigated for acrylic resin compositions in which the adjacent colloidal particles repel one another by electrostatic force. The measurement methods and the evaluation methods of physical properties are as follows.

(Identification of Acrylic Resin)

The identification of the acrylic resin was performed by analyzing the resin using "IR Prestige-21" that is a Fourier transform infrared spectrophotometer manufactured by Shimadzu Corporation.

(Mean Diameter of Colloidal Particles)

The mean diameter of the colloidal particles in the acrylic resin composition was obtained by measuring colloidal silica before made into a powder using a disc centrifugal particle size distribution analyzer "DC24000" manufactured by CPS Instruments, Inc.

(Identification of Silicon Oxide and its Content)

For the identification of silicon oxide in the acrylic resin composition and the measurement of the weight by percentage, the contained elements were identified by a fluorescent X-ray analysis using "SEA1200VX" manufactured by SII Nano Technology, Inc., and the weight percentage was measured by a thermogravimetric analysis using "DTG-60H" manufactured by Shimadzu Corporation.

(Mean Distance Between Colloidal Particles)

The mean distance between the colloidal particles was measured based on a SEM image. The SEM image was obtained by taking a image of an arbitrary fracture cross-section of the acrylic resin composition using a scanning electron microscope "S-4100" manufactured by Hitachi, Ltd. at a magnification of 150,000×. The mean distance was obtained by measuring 10 arbitrary points in the SEM image, calculating the average value of the measurement, and converting the average value from the magnification.

(Crystallinity)

The crystallinity of the acrylic resin composition was analyzed with a spectrophotometer "U4100" manufactured by Hitachi High-Technologies Corporation having a halogen lamp as a light source.

(Visibility)

The evaluation of the visibility of the polycrystal was performed by visually observing the obtained acrylic resin composition considering the portion that was recognized mainly as purple to red as being a polycrystal. The following determination criteria were used.

○: Polycrystals were observed on the surface of the acrylic resin composition.

X: No polycrystals were observed on the surface of the acrylic resin composition at all.

The acrylic monomers liquid at room temperature (15 to 30° C.) used in the production of the acrylic resin composition are as follows.

2-hydroxyethyl acrylate: tradename "HEMA" manufactured by Nippon Shokubai Co., Ltd.

Methoxypolyethylene glycol #400 methacrylate: "FA-400M" manufactured by Hitachi Chemical Co., Ltd.

4-hydroxy acrylate: "4HBA" manufactured by Nippon Kasei Chemical Co., Ltd.

Examples 1 to 11

Production of Acrylic Resin Composition

First, 200 g of colloidal silica and 200 g of methanol were weighed and placed in a polypropylene container, and centrifugation was performed at a rotational speed of 9100 rpm for 1 hour using a centrifugal separator. After the centrifugation, the supernatant liquid produced in the container was discarded, almost the same amount of methanol as the discarded liquid was placed in the container, and the centrifugation was performed again using a centrifugal separator. This step was repeated three times. After the centrifugation was completed, a silicon oxide powder was obtained by drying the solid component in a dryer at a temperature of 45° C.

Next, dispersions were obtained by mixing and dispersing the obtained silicon oxide powder having various mean diameters in a range of 10 to 65% by weight in the acrylic monomer in a range of 35 to 90% by weight in combinations shown in Table 1.

The dispersing was performed by irradiating the mixture with an ultrasound wave having a frequency of 24 kHz for 1 hour using an ultrasound wave dispersing apparatus. The "mean diameter of silicon oxide powder" in Table 1 was obtained by measuring 10 arbitrary points in the SEM image obtained in the same way as in the "mean distance between colloidal particles" and calculating the average value of the measurement. In Example 4 of Examples 1 to 11, impurities pyridine was added also when the silicon oxide powder and the acrylic monomer were mixed. Pyridine was added so that the ratio to the total amount of the acrylic resin composition became 0.3 ppm.

Then, an acrylic resin composition was obtained by adding 2-hydroxy-2-methylpropiophenone in the dispersion as a polymerization initiator, transferring the dispersion to a glass container, and curing the acrylic monomer by irradiation with an ultraviolet ray.

<Evaluation>

Identification of the acrylic resin, the mean diameter of the colloidal particles, identification of silicon oxide and its content, the mean distance between the colloidal particles, crystallinity, and visibility were evaluated for the obtained acrylic resin composition according to the methods described above. The result is shown in Table 2.

Comparative Examples 1 and 2

The additive amount of the silicon oxide powder was changed to 5% by weight and the additive amount of the acrylic monomer was changed to 95% by weight. Dispersions were obtained by mixing and dispersing the silicon oxide powder in the acrylic monomer in combinations shown in Table 1. An acrylic resin composition was obtained using this dispersion in the same way as in the examples. Identification of the acrylic resin, the mean diameter of the colloidal particles, identification of silicon oxide and its content, the mean distance between the colloidal particles, crystallinity, and visibility were evaluated for the obtained acrylic resin composition according to the methods described above. The result is shown in Table 2.

TABLE 1

| | Acrylic monomer | | Silicon oxide powder | |
|---|---|---|---|---|
| | Composition[1] | Additive amount (% by weight) | Mean diameter (nm) | Additive amount (% by weight) |
| Example 1 | HEMA | 84 | 136 | 16 |
| Example 2 | HEMA | 82 | 136 | 18 |
| Example 3 | HEMA | 75 | 136 | 25 |
| Example 4 | HEMA | 75 | 136 | 25 |
| Example 5 | HEMA | 65 | 207 | 35 |
| Example 6 | HEMA | 55 | 207 | 45 |
| Example 7 | FA-400M | 70 | 136 | 30 |
| Example 8 | FA-400M | 60 | 136 | 40 |
| Example 9 | 4HBA | 70 | 136 | 30 |
| Example 10 | 4HBA | 65 | 136 | 35 |
| Example 11 | 4HBA | 50 | 207 | 50 |
| Comp. Ex. 1 | HEMA | 95 | 136 | 5 |
| Comp. Ex. 2 | 4HBA | 95 | 136 | 5 |

[1]HEMA: 2-hydroxyethyl acrylate 4HBA: 4-hydroxy acrylate FA-400M: Methoxypolyethylene glycol #400 methacrylate

TABLE 2

| | Acrylic resin[1] | Mean diameter of colloidal particles (nm) | Content of silicon oxide (% by weight) | Mean distance between colloidal particles (nm) | Crystalinity | Visibility | Notes |
|---|---|---|---|---|---|---|---|
| Example 1 | HEMA | 136 | 16 | 251 | Polycrystal | ○ | |
| Example 2 | HEMA | 136 | 18 | 240 | Polycrystal | ○ | |
| Example 3 | HEMA | 136 | 25 | 213 | Polycrystal | ○ | |
| Example 4 | HEMA | 136 | 25 | 213 | Polycrystal | ○ | Add pyridine |
| Example 5 | HEMA | 207 | 35 | 277 | Polycrystal | ○ | |
| Example 6 | HEMA | 207 | 45 | 255 | Polycrystal | ○ | |
| Example 7 | FA-400M | 136 | 30 | 198 | Polycrystal | ○ | |
| Example 8 | FA-400M | 136 | 40 | 176 | Polycrystal | ○ | |
| Example 9 | 4HBA | 136 | 30 | 198 | Polycrystal | ○ | |
| Example 10 | 4HBA | 136 | 35 | 186 | Polycrystal | ○ | |
| Example 11 | 4HBA | 207 | 50 | 243 | Polycrystal | ○ | |

TABLE 2-continued

|  | Acrylic resin[1] | Mean diameter of colloidal particles (nm) | Content of silicon oxide (% by weight) | Mean distance between colloidal particles (nm) | Crystalinity | Visibility | Notes |
|---|---|---|---|---|---|---|---|
| Comp. Ex. 1 | HEMA | 136 | 5 | — | Amorphous | X | |
| Comp. Ex. 2 | 4HBA | 136 | 5 | — | Amorphous | X | |

[1]HEMA: 2-hydroxyethyl acrylate
4HBA: 4-hydroxy acrylate
FA-400M: Methoxypolyethylene glycol #400 methacrylate As is apparent from Table 2, in Examples 1 to 11, polycrystals of colloidal particles of silicon oxide are contained in the acrylic resin, the mean distance between the colloidal particles is 140 to 330 nm and the visibility is excellent.

Figure 4:
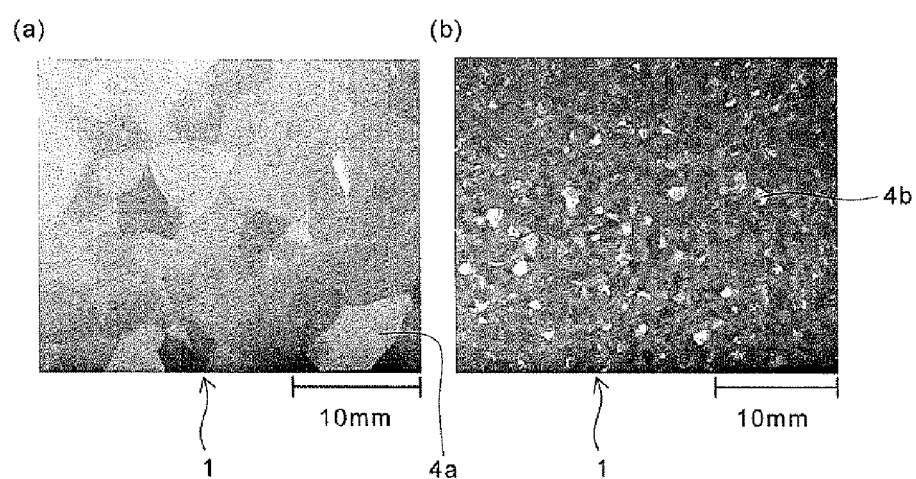
FIG. 4(a) is a digital camera picture of the acrylic resin composition obtained in Example 1.
FIG. 4(b) is a digital camera picture of the acrylic resin composition obtained in Example 2.
Figure 5:
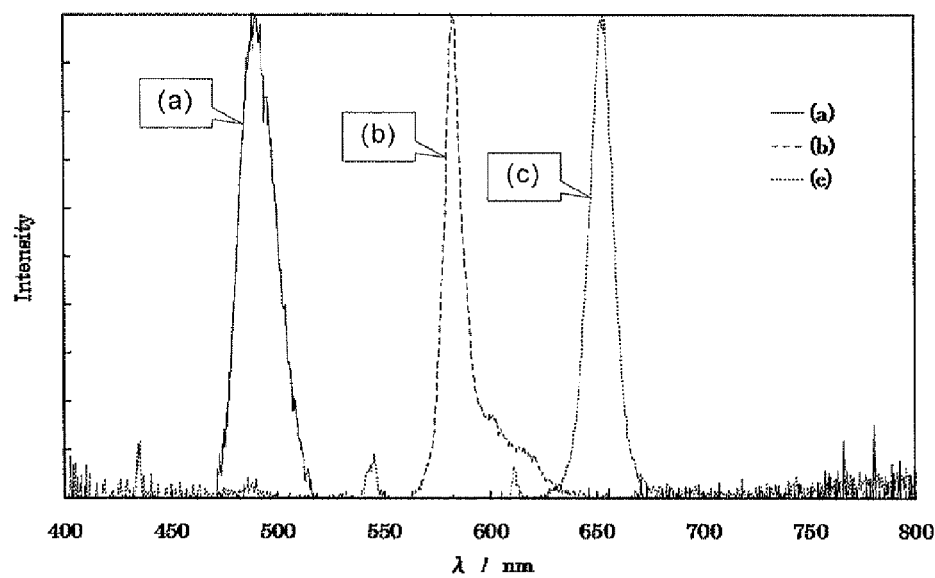
FIG. 5 is a reflection spectrum of various crystals in the acrylic resin composition obtained in Example 1, and (a) shows blue, (b) shows green, and (c) shows red of the play of color.

More specifically, in Example 1, a polycrystal was obtained in Example 1 having a single crystal 4a having a size of 10 mm or more at maximum among the single crystals that constitute the polycrystal as shown in FIG. 4(*a*), and it was a polycrystal having red, green, and blue as main colors as shown in FIG. 5. In Example 2, a polycrystal was obtained consisting of a single crystal 4b having a uniform size of about 1 mm as shown in FIG. 4(*b*). The reflection spectrum shown in FIG. 5 was obtained by measurement with a multichannel fiber spectrometer "USB2000" manufactured by Ocean Optics, Inc.

In Examples 3 and 4, the constituents are the same except that whether impurities pyridine was added or not (refer to "notes" in Table 2). In Example 3, a polycrystal was obtained consisting of many single crystals that are too small to confirm visually even though excellent visibility was obtained by controlling the mean distance between the colloidal particles to be 140 to 330 nm. Contrary to this, a polycrystal was obtained in Example 4 having green as amain color and having many single crystals having a size of 10 mm or more, that is the same level as in Example 1, by adding pyridine.

In Examples 5 and 6, a polycrystal was obtained having red to green as a main color. In Examples 7 and 8, a polycrystal was obtained having a size of about 1 mm and having green to purple as a main color. In Examples 9 and 10, a polycrystal was obtained having a size of 1 min or more and having green to purple as a main color, and the cured product was soft and rubber-like. In Example 11, a rubber-like cured product was obtained consisting of fine single crystals and having an appearance of iris color.

On the other hand, either of the products in Comparative Examples 1 and 2 was amorphous and no polycrystals were confirmed. The reason for this is assumed that the content of silicon oxide is smaller than that of Examples 1 to 11.

The invention claimed is:

1. An acrylic resin composition, comprising:
an acrylic resin that is formed by curing at least one of an acrylic monomer liquid at room temperature and an acrylic oligomer liquid at room temperature; and a polycrystal comprising an aggregate of a plurality of single crystals having different orientations, each single crystal comprising a plurality of colloidal particles, each colloidal particle comprising silicon oxide, wherein the silicon oxide is not coated with an organic molecule, wherein
all of the single crystals are in the acrylic resin,
a mean diameter of the colloidal particles is 136 to 207 nm,
a mean distance between the colloidal particles in the polycrystal is 140 to 330 nm,
sizes of all the single crystals are greater than or equal to 1 mm, and wherein the content of the silicon oxide is 10 to 65% by weight.

2. The acrylic resin composition according to claim 1, wherein the adjacent colloidal particles repel one another by electrostatic force.

3. The acrylic resin composition according to claim 1, wherein the content of the acrylic resin is 35 to 90% by weight.

4. A method of manufacturing the acrylic resin composition according to claim 1, wherein the size of a single crystal that constitutes the polycrystal is controlled by adjusting at least one of the content of the silicon oxide and/or the additive amount of impurities.

5. An architectural material that is formed using the acrylic resin composition according to claim 1.

6. An optical material that is formed using the acrylic resin composition according to claim 1.

* * * * *